(12) United States Patent
Xiang et al.

(10) Patent No.: US 11,153,915 B2
(45) Date of Patent: Oct. 19, 2021

(54) CONTROL INFORMATION SENDING METHOD, BASE STATION, AND USER EQUIPMENT

(71) Applicant: Huawei Technologies Co., Ltd., Shenzhen (CN)

(72) Inventors: Zhengzheng Xiang, Shanghai (CN); Jiyong Pang, Shanghai (CN); Hongjia Su, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 16/714,363

(22) Filed: Dec. 13, 2019

(65) Prior Publication Data

US 2020/0146073 A1    May 7, 2020

Related U.S. Application Data

(63) Continuation of application No. PCT/CN2018/088544, filed on May 26, 2018.

(30) Foreign Application Priority Data

Jun. 16, 2017    (CN) .......................... 201710459566.4

(51) Int. Cl.
*H04W 4/00* (2018.01)
*H04W 74/08* (2009.01)
(Continued)

(52) U.S. Cl.
CPC ....... *H04W 74/0833* (2013.01); *H04L 5/0057* (2013.01); *H04W 74/002* (2013.01)

(58) Field of Classification Search
CPC ............ H04W 74/0833; H04W 74/002; H04L 5/0057
(Continued)

(56) References Cited

U.S. PATENT DOCUMENTS

2008/0316961 A1    12/2008  Bertrand et al.
2011/0098043 A1*   4/2011   Yu .......................... H04W 68/02
                                                              455/435.1
(Continued)

FOREIGN PATENT DOCUMENTS

CN         105075385 A    11/2015
CN         105453679 A     3/2016
(Continued)

*Primary Examiner* — Thai D Hoang
(74) *Attorney, Agent, or Firm* — Slater Matsil, LLP

(57) ABSTRACT

A method for controlling information, a base station and a user equipment are disclosed. In an embodiment a method includes receiving, by a base station, first signaling from a first user equipment, wherein the first signaling carries an identifier of the first user equipment and information about a preamble sequence, the identifier to be used for random access between the first user equipment and the base station, and the preamble sequence to be used for random access between the first user equipment and second user equipment; and sending, by the base station, second signaling to the first user equipment and the second user equipment, wherein the second signaling carries information about a user equipment cooperation group and the user equipment cooperation group includes the first user equipment and the second user equipment.

15 Claims, 9 Drawing Sheets

(51) Int. Cl.
*H04L 5/00* (2006.01)
*H04W 74/00* (2009.01)

(58) Field of Classification Search
USPC .............. 370/329–330, 335–345, 347–348
See application file for complete search history.

(56) References Cited

U.S. PATENT DOCUMENTS

| | | | |
|---|---|---|---|
| 2012/0250520 A1* | 10/2012 | Chen ...................... | H04L 5/001 370/241 |
| 2014/0206322 A1 | 7/2014 | Dimou et al. | |
| 2015/0341878 A1* | 11/2015 | Lee ..................... | H04W 72/042 370/329 |
| 2016/0165640 A1* | 6/2016 | Yang ..................... | H04W 74/08 370/336 |
| 2018/0139668 A1 | 5/2018 | Takahashi et al. | |
| 2018/0184461 A1* | 6/2018 | Zhang ................. | H04W 72/042 |
| 2018/0270868 A1* | 9/2018 | Ou ...................... | H04W 72/042 |
| 2019/0373657 A1 | 12/2019 | Maaref | |

FOREIGN PATENT DOCUMENTS

| | | | | |
|---|---|---|---|---|
| CN | 105657776 A | 6/2016 | | |
| CN | 105792380 A | 7/2016 | | |
| CN | 106793146 A | 5/2017 | | |
| EP | 3409036 A1 | 12/2018 | | |
| EP | 3637804 A1 | 4/2020 | | |
| WO | 2012028200 A | 3/2012 | | |
| WO | WO-2013044855 A1 * | 4/2013 | ............ | H04W 76/14 |
| WO | 2016021638 A1 | 2/2016 | | |

* cited by examiner

CONTROL INFORMATION SENDING METHOD, BASE STATION, AND USER EQUIPMENT

CROSS-REFERENCE TO RELATED APPLICATIONS

This application is a continuation of International Application No. PCT/CN2018/088544, filed on May 26, 2018, which claims priority to Chinese Patent Application No. 201710459566.4, filed on Jun. 16, 2017. The disclosures of the aforementioned applications are hereby incorporated by reference in their entireties.

TECHNICAL FIELD

This application relates to the field of communications technologies, and in particular, to a control information sending method, a base station, and user equipment.

BACKGROUND

In a next-generation communications system, user equipment cooperation communication may significantly increase a capacity of the system and network coverage, and may further reduce a load of a base station side. FIG. 1 is a schematic diagram of a typical scenario of user equipment cooperation communication. As shown in FIG. 1, there are mainly two phases in the user equipment cooperation communication. At a first phase, a base station sends data to target user equipment (TUE) and related cooperation user equipment (CUE), for example, CUE1 and CUE2 that provide cooperation for the TUE in FIG. 1. At a second phase, the CUE1 and the CUE2 forward correctly received signals to the TUE. In this way, the TUE may combine the signal that is sent by the base station and that is received at the first phase with the signals that are forwarded by the CUE1 and the CUE2 and that are received at the second phase to perform decoding, so as to improve receiving performance.

In the user equipment cooperation communication, TUE and several CUEs that serve the TUE form a user equipment cooperation group. For example, the TUE, the CUE1, and the CUE2 that are in FIG. 1 form one user equipment cooperation group. User equipment (UE) may be TUE in one user equipment cooperation group, and may also be CUE in one or more other user equipment cooperation groups. Therefore, in the user equipment cooperation communication, a user equipment cooperation group usually needs to be established (establishing a group for a short). In a process of establishing a group by using a plurality of UEs, a base station sends a group identifier of the user equipment cooperation group to the plurality of UEs. UEs that obtain a same group identifier form one user equipment cooperation group.

However, before a group is established, it is required that CUE has accessed a base station or has completed a random access process in advance. Then the group can be established, and cooperation communication can be provided for TUE. This not only increases signaling overheads but also increases a processing delay.

SUMMARY

Embodiments of this application provide a control information sending method, a base station, and user equipment, to reduce signaling overheads for establishing a user equipment cooperation group.

According to a first aspect, an embodiment of this application provides a control information sending method, including: receiving, by a base station, first signaling from first user equipment, where the first signaling carries an identifier of the first user equipment and information about a preamble sequence, the identifier is used for random access between the first user equipment and the base station, and the preamble sequence is used for random access between the first user equipment and second user equipment; and sending, by the base station, second signaling to the first user equipment and the second user equipment, where the second signaling carries information about a user equipment cooperation group, and the user equipment cooperation group includes the first user equipment and the second user equipment. The first signaling is used for random access between the first user equipment and the base station. For example, the first signaling may be a message 3 in a random access process. The preamble sequence is a device-to-device D2D random access preamble sequence. The first user equipment is neighboring user equipment NUE, and the second user equipment is CUE.

According to a second aspect, an embodiment of this application provides a data sending method, including: sending, by first user equipment, first signaling to a base station, where the first signaling carries an identifier of the first user equipment and information about a preamble sequence, the identifier is used for random access between the first user equipment and the base station, and the preamble sequence is used for random access between the first user equipment and second user equipment; receiving, by the first user equipment, second signaling from the base station, where the second signaling carries information about a user equipment cooperation group, and the user equipment cooperation group includes the first user equipment and the second user equipment; and sending, by the first user equipment, a request for establishing the user equipment cooperation group to the second user equipment. The first signaling is used for random access between the first user equipment and the base station. For example, the first signaling may be a message 3 in a random access process. The preamble sequence is a device-to-device D2D random access preamble sequence. The first user equipment is neighboring user equipment NUE, and the second user equipment is CUE.

According to a third aspect, an embodiment of this application provides a base station, including: a receiver, configured to receive first signaling from first user equipment, where the first signaling carries an identifier of the first user equipment and information about a preamble sequence, the identifier is used for random access between the first user equipment and the base station, and the preamble sequence is used for random access between the first user equipment and second user equipment; a processor, configured to obtain information about a user equipment cooperation group; and a transmitter, configured to send second signaling to the first user equipment and the second user equipment, where the second signaling carries information about the user equipment cooperation group, and the user equipment cooperation group includes the first user equipment and the second user equipment. The first signaling is used for random access between the first user equipment and the base station. For example, the first signaling may be a message 3 in a random access process. The preamble sequence is a device-to-device D2D random access preamble sequence. The first user equipment is neighboring user equipment NUE, and the second user equipment is CUE.

According to a fourth aspect, an embodiment of this application provides first user equipment, including: a transmitter, configured to send first signaling to a base station, where the first signaling carries an identifier of the first user equipment and information about a preamble sequence, the identifier is used for random access between the first user equipment and the base station, and the preamble sequence is used for random access between the first user equipment and second user equipment; and a receiver, configured to receive second signaling from the base station, where the second signaling carries information about a user equipment cooperation group, the user equipment cooperation group includes the first user equipment and the second user equipment, and the transmitter is further configured to send a request for establishing the user equipment cooperation group to the second user equipment. The first signaling is used for random access between the first user equipment and the base station. For example, the first signaling may be a message 3 in a random access process. The preamble sequence is a device-to-device D2D random access preamble sequence. The first user equipment is neighboring user equipment NUE, and the second user equipment is CUE.

According to a fifth aspect, an embodiment of this application provides a computer-readable medium. The computer-readable medium stores a computer program. When the computer program is executed by a computer, the computer implements the method in any one of the first aspect or the possible implementations of the second aspect.

According to a sixth aspect, an embodiment of this application provides a computer program product. When the computer program product is executed by a computer, the computer implements the method in any one of the first aspect or the possible implementations of the second aspect.

According to a seventh aspect, an embodiment of this application provides a processing apparatus, including a processor and an interface.

The processor is configured to perform the method in any one of the first aspect or the possible implementations of the second aspect.

It should be understood that the processing apparatus in the seventh aspect may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently. According to the foregoing aspects, this application further provides various possible embodiments.

In a possible embodiment, the information about the preamble sequence includes an index of the preamble sequence and/or information about a time-frequency resource occupied by the preamble sequence.

In a possible embodiment, the first signaling further carries a channel quality indicator CQI of a channel between the first user equipment and the second user equipment.

It can be learned from the foregoing that the first signaling may be the message 3 used for random access between the user equipment and the base station. Specifically, the message 3 may be carried by using MAC layer signaling. A MAC control element in the MAC layer signaling may carry an index used to indicate the D2D random access preamble sequence received by NUE. The MAC control element may further include a channel quality indicator CQI of a channel between the NUE and TUE. The MAC control element may further include information about a time-frequency resource of the D2D random access preamble sequence, for example, the time-frequency resource information may include a subframe number of a first subframe in a subframe occupied by the D2D random access preamble sequence received by the NUE and/or a sequence number of a first RB in a frequency band occupied by the D2D random access preamble sequence received by the NUE. The MAC control element may include information about a plurality of D2D random access preamble sequences. An index corresponding to an LCID value of the MAC control element may be selected from a reserved index. Still further, a part of a frame format of the MAC control element may be a frame format shown in any one of FIG. 6 to FIG. 9.

In a possible embodiment, the information about the user equipment cooperation group is a group identifier of the user equipment cooperation group.

In a possible embodiment, the second signaling further carries a cell-radio network temporary identifier C-RNTI of the first user equipment and/or a C-RNTI of the second user equipment. Second signaling may be a request message for random access between user equipment and user equipment. Specifically, the request message may be carried by using the MAC layer signaling. A MAC subheader in the MAC layer signaling includes an indicator bit F, and when F=1, it indicates that the MAC subheader is a MAC subheader corresponding to a D2D RAR. First two octets of the MAC control element in the MAC layer signaling are used to represent a user equipment cooperation group identifier allocated by the base station, and middle two octets are used to represent a C-RNTI of the TUE. Last two octets are used as a reserved bit, and may be used to carry other information related to the user equipment cooperation group. In addition, the D2D RAR may be designed separately. In the MAC subheader corresponding to the D2D RAR, a flag bit F may be set to represent whether the MAC subheader is corresponding to a D2D RAR for the TUE or a D2D RAR for the NUE. For example, F=1 indicates that the MAC subheader is corresponding to the D2D RAR for the TUE, and F=0 indicates that the MAC subheader is corresponding to the D2D RAR for the NUE. Still further, a part of a frame format of the MAC layer signaling corresponding to the request message may be the frame format shown in FIG. 10, FIG. 12, or FIG. 13.

According to the method in the embodiments of this application, the NUE adds, to the message 3 used for random access, related information for establishing a group, so that the base station can directly deliver a D2D random access response based on information carried in the message 3. Therefore, the group can be rapidly established to reduce signaling overheads.

DETAILED DESCRIPTION OF ILLUSTRATIVE EMBODIMENTS

In embodiments of this application, in some cases, user equipment may refer to a terminal or a mobile device, for example, a mobile phone, a personal digital assistant (PDA), a handheld or laptop computer, and a similar device with a telecommunication capability. In another case, the user equipment may refer to a non-portable device having a similar capability, for example, a desktop computer, a set-top box, or a network device. The user equipment may also refer to any hardware or software component that can implement communication between users. In addition, the user equipment described in the embodiments of this application may also be referred to as a subscriber unit, a subscriber station, a mobile station, a remote station, a remote terminal, a user terminal, a wireless communications device, a user agent, or a user apparatus.

In the embodiments of this application, a base station may include a base station in a conventional wireless communications system such as a 2G/3G system, or may include a system and a device that are used as an improved peer device in the conventional wireless communications system. The advanced or next-generation device may be included in an evolved wireless communications standard (for example, long term evolution (LTE)). For example, an LTE system may include an evolved universal terrestrial radio access network (E-UTRAN) evolved NodeB (eNB), a wireless access point, or a similar component. Any such component is referred to as an eNB in this specification, but it should be understood that the component is not necessarily an eNB. For example, a next-generation communications system or a 5G communications system uses "gNB" in place of an eNB in the LTE system.

Figure 1:
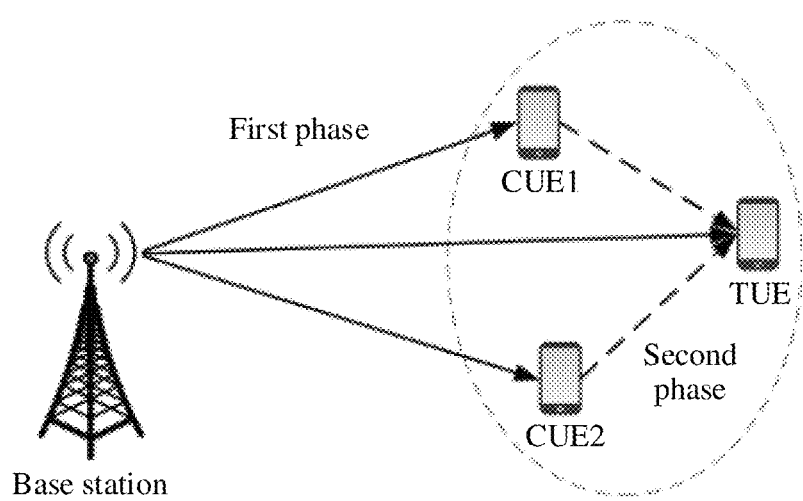
FIG. 1 is a schematic diagram of a typical scenario of user equipment cooperation communication.
Figure 2:
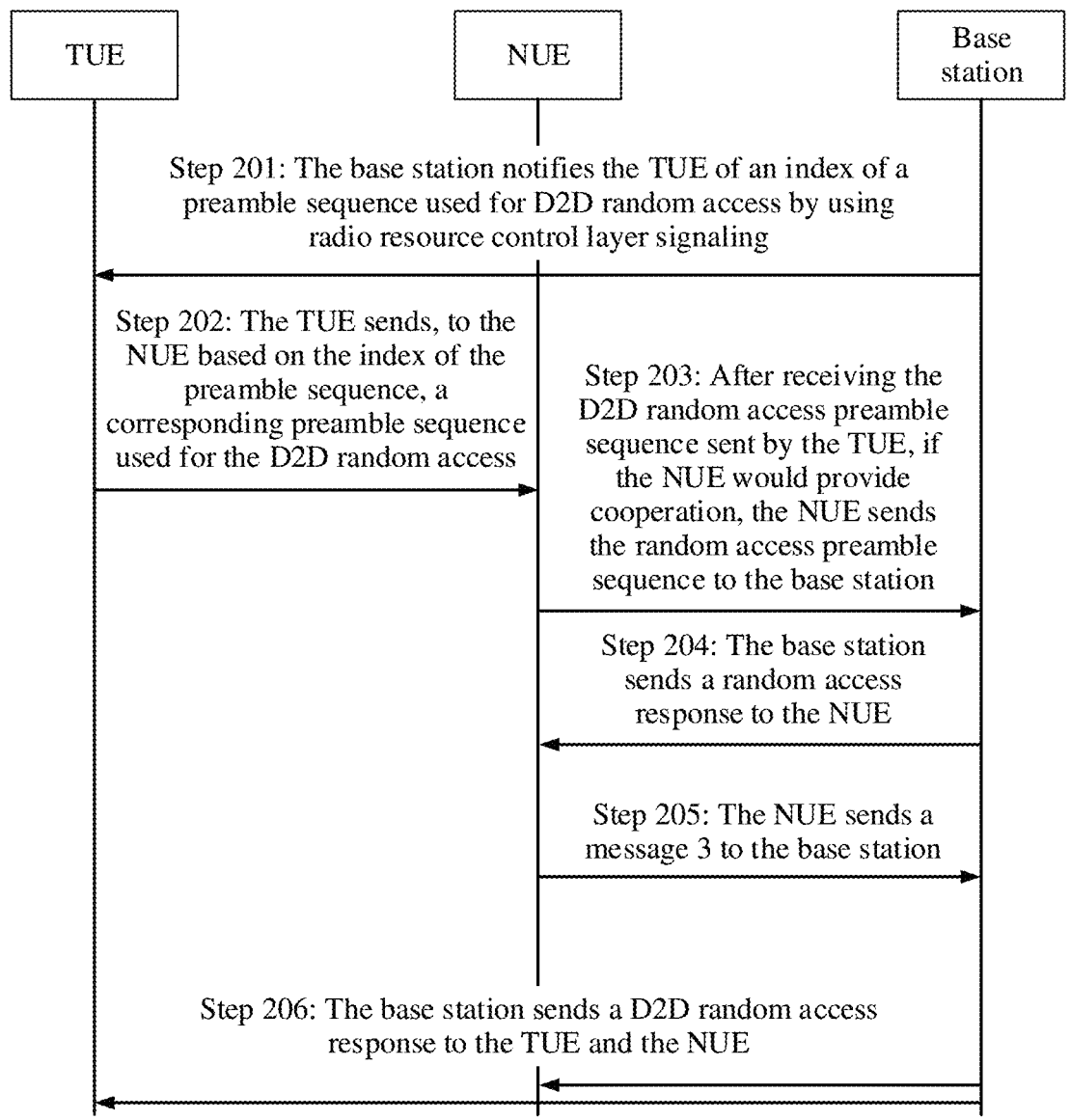
FIG. 2 is a schematic flowchart of a method for establishing a user equipment cooperation group according to an embodiment of this application.

In user equipment cooperation communication, a user equipment cooperation group usually needs to be established, and user equipment in the user equipment cooperation group includes TUE and CUE. However, before the user equipment cooperation group is established, user equipment that may provide cooperation is usually neighboring user equipment near the TUE. The user equipment may be referred to as neighboring user equipment (NUE). FIG. 2 is a schematic flowchart of a method for establishing a user equipment cooperation group according to an embodiment of this application. As shown in FIG. 2, the method provides a process of establishing the user equipment cooperation group by using one TUE and one NUE. Further, a process of establishing a group by one TUE and a plurality of NUEs may be obtained in a similar manner. The method includes the following several steps.

Step 201: A base station notifies, by using radio resource control (RRC) layer signaling, the TUE of an index of a preamble sequence used for device-to-device (D2D) random access. The D2D random access may be random access between UE and UE.

Step 202: The TUE sends, to the NUE based on the index of the preamble sequence, a corresponding preamble sequence used for the D2D random access. The TUE may send the preamble sequence for the D2D random access to the NUE. Specifically, the TUE may send the preamble sequence for the D2D random access to one or more NUEs. For ease of description, the following describes one NUE, and a case of a plurality of NUEs may be similarly obtained.

Step 203: After receiving the D2D random access preamble sequence sent by the TUE, the NUE sends a random access preamble sequence to the base station through a physical random access channel (PRACH). The NUE is NUE that meets a specific condition, for example, the NUE is NUE whose channel quality from the NUE to the base station is better than a preset threshold. In addition, the random access herein is not D2D random access, but random access between the UE and the base station.

Step 204: After receiving the random access preamble sequence sent by the NUE, the base station sends a random access response (RAR) to the NUE.

Step 205: After receiving the RAR of the base station, the NUE sends a message 3 to the base station. The message 3 carries an identifier of the NUE and information about the received D2D random access preamble sequence. The identifier of the NUE may be a cell-radio network temporary identifier (C-RNTI). The information about the D2D random access preamble sequence includes an index of the D2D random access preamble sequence and/or information about a time-frequency resource of the D2D random access preamble sequence.

Step 206: The base station sends a D2D random access response (D2D RAR) to the TUE and the NUE. The D2D RAR includes a group identifier allocated by the base station for the user equipment cooperation group and other related information. Specifically, the base station determines, based on the message 3 received from the NUE, that the NUE may provide cooperation for the TUE, or that the NUE may become CUE of the TUE. One TUE may have one or more NUEs that can provide the cooperation for the TUE. In this case, the TUE and all NUEs that may become the CUE of the TUE form one user equipment cooperation group. The base station sends the D2D RAR to the user equipment cooperation group.

Figure 2A:
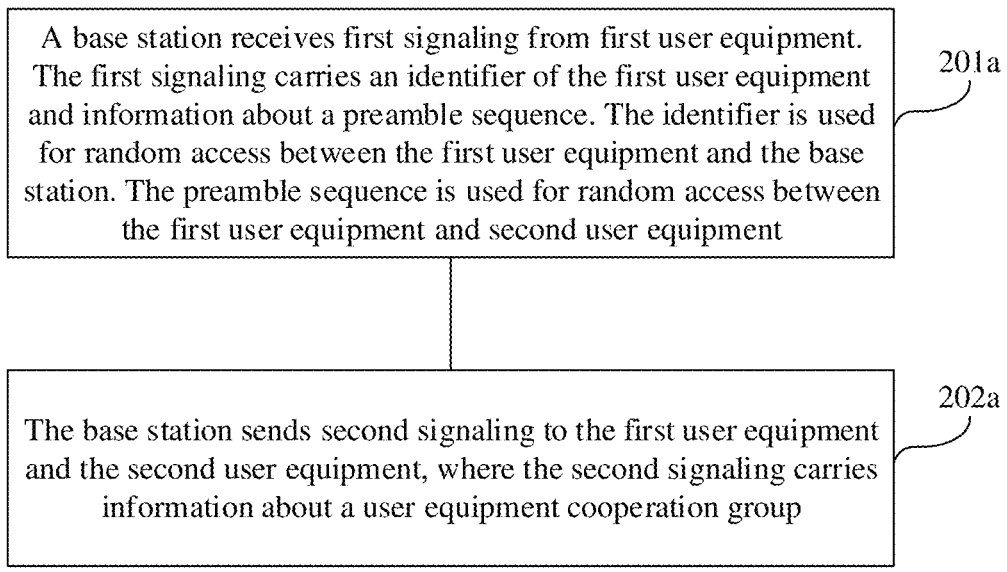
FIG. 2a is a schematic flowchart of a control signaling sending method according to an embodiment of this application.

Further, an embodiment of this application further provides a control signaling sending method. As shown in FIG. 2a, the method includes the following steps.

Step 201a: A base station receives first signaling from first user equipment, where the first signaling carries an identifier of the first user equipment and information about a preamble sequence. The identifier is used for random access between the first user equipment and the base station. The preamble sequence is used for random access between the first user equipment and second user equipment.

The first user equipment may be the NUE in the method shown in FIG. 2, and the second user equipment may be the TUE in the method shown in FIG. 2. The first signaling may be the message 3 in the method shown in FIG. 2. The preamble sequence may be the preamble sequence for the D2D random access in step 202. The information about the preamble sequence includes an index of the preamble sequence and/or information about a time-frequency resource occupied by the preamble sequence. The first signaling may further carry a channel quality indicator CQI of a channel between the first user equipment and the second user equipment.

Step 202a: The base station sends second signaling to the first user equipment and the second user equipment, where the second signaling carries information about the user equipment cooperation group. In addition, the user equipment cooperation group includes the first user equipment and the second user equipment.

The second signaling may be the D2D RAR in the method shown in FIG. 2. The information about the user equipment cooperation group may be a group identifier of the user equipment cooperation group. The second signaling may further carry a cell-radio network temporary identifier C-RNTI of the first user equipment and/or a C-RNTI of the second user equipment.

Figure 2B:
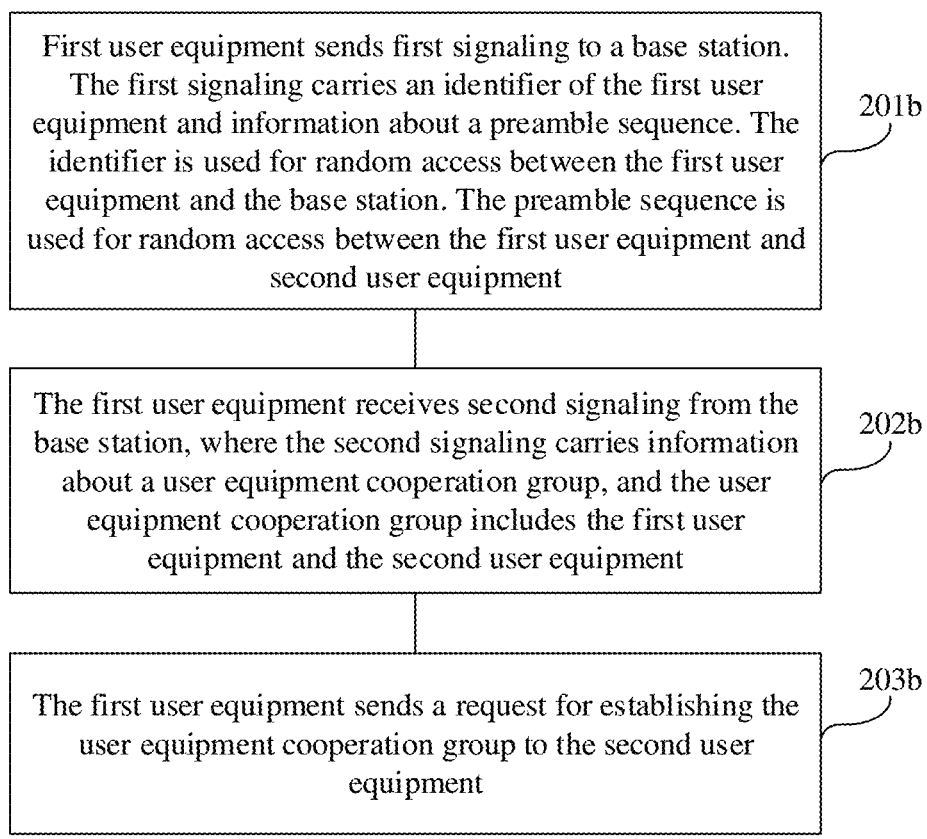
FIG. 2b is a schematic flowchart of a data sending method according to an embodiment of this application.

Further, an embodiment of this application further provides a data sending method. As shown in FIG. 2b, the method includes the following steps.

Step 201b: First user equipment sends first signaling to a base station. The first signaling carries an identifier of the first user equipment and information about a preamble sequence. The identifier is used for random access between the first user equipment and the base station. The preamble sequence is used for random access between the first user equipment and second user equipment.

The first user equipment may be the NUE in the method shown in FIG. 2, and the second user equipment may be the TUE in the method shown in FIG. 2. The first signaling may be the message 3 in the method shown in FIG. 2. The preamble sequence may be the preamble sequence for the D2D random access in step 202. The information about the preamble sequence includes an index of the preamble sequence and/or information about a time-frequency resource occupied by the preamble sequence. The first signaling may further carry a channel quality indicator CQI of a channel between the first user equipment and the second user equipment.

Step 202b: The first user equipment receives second signaling from the base station, where the second signaling carries information about a user equipment cooperation group, and the user equipment cooperation group includes the first user equipment and the second user equipment.

The second signaling may be the D2D RAR in the method shown in FIG. 2. The information about the user equipment cooperation group may be a group identifier of the user equipment cooperation group. The second signaling may further carry a cell-radio network temporary identifier C-RNTI of the first user equipment and/or a C-RNTI of the second user equipment.

Step 203b: The first user equipment sends a request for establishing the user equipment cooperation group to the second user equipment. After receiving the request for establishing the user equipment cooperation group, the second user equipment sends a response message to the first user equipment, thereby establishing the user equipment cooperation group with the first user equipment. Further, the first user equipment may establish a user equipment cooperation group with a plurality of other user equipment, and use the user equipment cooperation group for cooperation communication.

According to the control information sending method, signaling overheads for establishing the user equipment cooperation group can be reduced.

In the procedure shown in FIG. 2, FIG. 2a, or FIG. 2b, when NUE that would participate in user equipment cooperation sends the message 3 to the base station, the NUE needs to carry the index of the previously received D2D random access preamble sequence. However, existing media access control (MAC) layer signaling does not have a related MAC control element to support the signaling. In addition, an existing RAR can only be used for random access between UE and a base station. There is no D2D RAR for the D2D random access. Therefore, related signaling needs to be further designed to support a method for establishing a user equipment cooperation group through random access. The signaling may be MAC layer signaling. The MAC layer signaling may be carried in a payload part of a MAC protocol data unit (PDU) for transmission.

Figure 3:
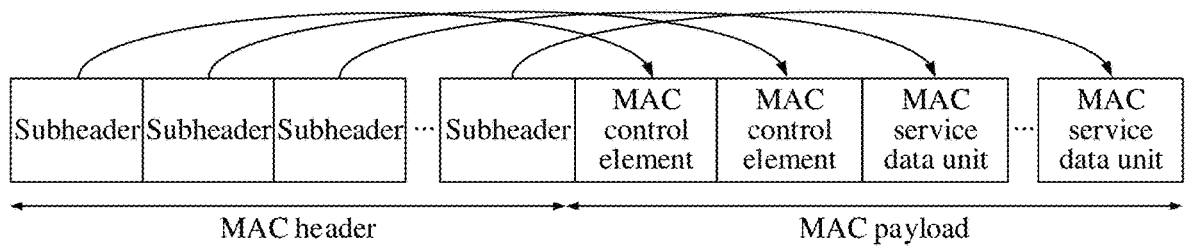
FIG. 3 is a schematic diagram of a frame structure of a MAC PDU.

FIG. 3 is a schematic diagram of a frame structure of a MAC PDU. As shown in FIG. 3, the MAC PDU includes a MAC header and a MAC payload. The MAC header includes one or more subheaders, and the MAC payload includes one or more MAC control elements and one or more MAC service data units. A quantity of the MAC control elements plus a quantity of the MAC service data units is equal to a quantity of the subheaders. The MAC layer signaling may be implemented by using the MAC control element, and the MAC control element is correspondingly indicated by using the subheader in the MAC header. The MAC control element may be used for user equipment to report a buffer, a power headroom, and the like to a base station, and may be further used for the base station to notify the user equipment of a timing advance, discrete reception, and the like.

Figure 4:
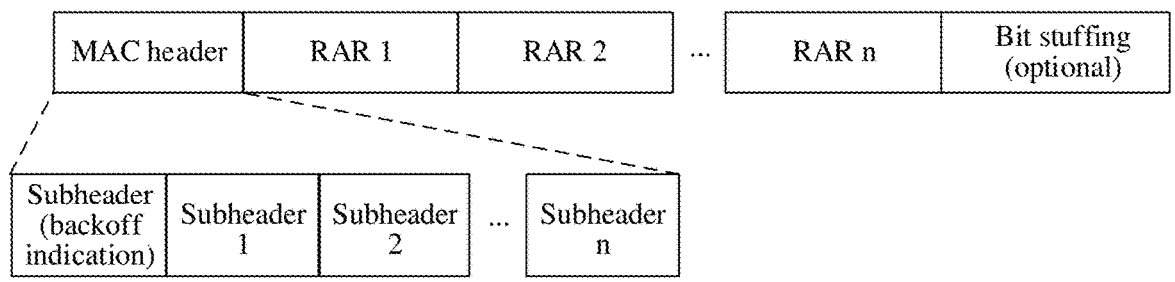
FIG. 4 is a schematic diagram of a frame structure of a MAC PDU corresponding to an RAR.

A MAC PDU corresponding to an RAR in a random access process is one type of the MAC PDU. FIG. 4 is a schematic diagram of a frame structure of a MAC PDU corresponding to an RAR. As shown in FIG. 4, a MAC header of the MAC PDU may include two types of subheaders. One is a subheader used for instructing UE to back off, for example, a subheader (backoff indication) in FIG. 4. The other is a subheader corresponding to an RAR, for example, subheaders 1 to n in FIG. 4. In addition, a subheader i is corresponding to an RAR i.

First, an embodiment of this application provides a MAC control element, to support NUE in reporting an index of a D2D random access preamble sequence received by the NUE to a base station by using a message 3. For example, Embodiment 1 to Embodiment 4.

In addition, for a design of a D2D RAR, an embodiment of this application provides a technical solution in which an RAR is reused to design a D2D RAR and a technical solution in which a D2D RAR is independently designed. For example, Embodiment 5 to Embodiment 6.

Embodiment 1

In a process of establishing a user equipment cooperation group, NUE receives information about a D2D random access preamble sequence from TUE. If the NUE would participate in user equipment cooperation, the NUE notifies a base station in a random access process. The NUE may learn of a time-frequency resource location of the D2D random access preamble sequence and an index of the D2D random access preamble sequence. However, the NUE does not know which TUE sends information about the D2D random access preamble sequence.

In an existing random access process, UE notifies a base station of a C-RNTI of the UE by using a message 3. Therefore, the UE carries a MAC control element of the C-RNTI in the message 3. A type of the MAC control element is indicated by using a logical channel identifier (LCID) in a MAC subheader corresponding to the MAC control element. In LTE, some LCID values of a PUSCH are shown in Table 1.

TABLE 1

Table of a correspondence between each of some LCID values of a PUSCH and an index

| Index | LCID value |
| --- | --- |
| 01100-10101 | Reserved |
| 11011 | C-RNTI |

Figure 5:
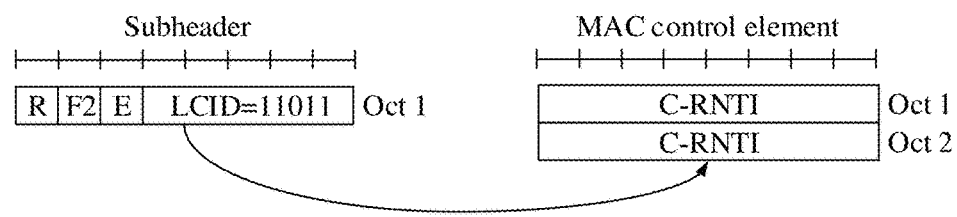
FIG. 5 is a schematic diagram of a subheader and a MAC control element that are corresponding to a C-RNTI.

It can be learned from Table 1 that, when an index corresponding to an LCID value of a MAC subheader is 11011, it indicates that a MAC control element corresponding to the MAC subheader is used to indicate a C-RNTI of user equipment. FIG. 5 is a schematic diagram of a subheader and a MAC control element that are corresponding to a C-RNTI. The MAC control element includes 16 bits, for example, Oct1 and Oct2 in FIG. 5, where Oct is an eight-bit byte. In addition, in indexes of LCID values of the PUSCH, some of the indexes are reserved indexes, for example, 01100 to 10101 in Table 1.

Figure 6:
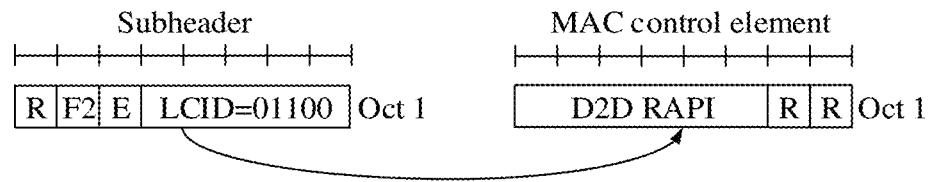
FIG. 6 is a schematic diagram of a MAC subheader and a MAC control element that are corresponding to a D2D RAPI.

In this embodiment, when sending the message 3 to the base station, the NUE not only needs to notify the base station of the C-RNTI of the NUE, but also needs to notify the base station of the index of the D2D random access preamble sequence received by the NUE. Therefore, in this embodiment, the MAC control element is added to indicate the index (random access preamble index, RAPI) of the D2D random access preamble sequence received by the NUE. An index corresponding to an LCID value of the MAC control element may be selected from a reserved index. For example, 01100 is selected from 01100 to 10101. Certainly, another reserved sequence number may be selected. This is not limited in this application. FIG. 6 is a schematic diagram of a MAC subheader and a MAC control element that are corresponding to a D2D RAPI. The D2D RAPI represents an index of a D2D random access preamble sequence received by NUE, and a length of the D2D RAPI is six bits, or may be another length. This is not limited in this application. The message 3 sent by the NUE to the base station includes at least a MAC control element corresponding to a C-RNTI and a MAC control element corresponding to the D2D RAPI.

Embodiment 2

A procedure of this embodiment is basically the same as that of Embodiment 1, and a difference lies in the following.

Figure 7:
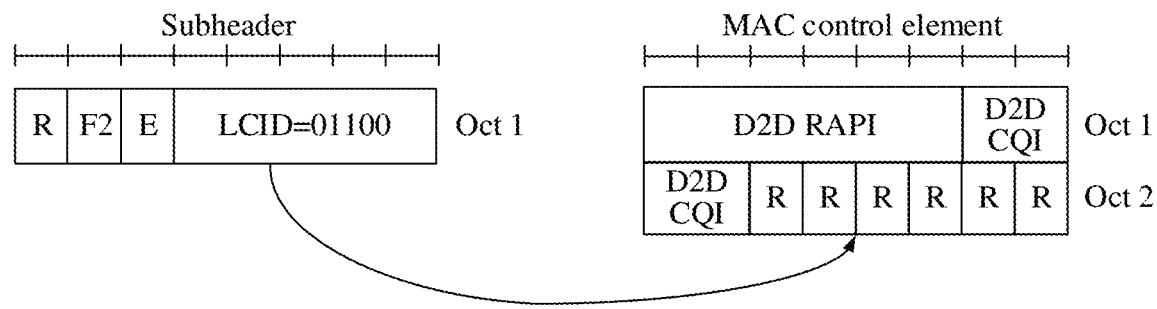
FIG. 7 is a schematic diagram of a MAC subheader and a MAC control element.

After receiving a D2D random access preamble sequence sent by TUE, NUE may estimate channel quality of a channel from the TUE to the NUE, so as to obtain a channel quality indicator (CQI) of the channel. In this way, the NUE may send the CQI of the channel to a base station by using a message 3. Therefore, the base station may determine, based on the CQI, whether the NUE is suitable for providing cooperation communication. Therefore, this embodiment provides a MAC control element used to carry the CQI. FIG. 7 is a schematic diagram of a MAC subheader and a MAC control element. As shown in FIG. 7, the MAC control element not only includes a D2D RAPI, but also includes the CQI of the channel between TUE and NUE. An index corresponding to an LCID value of the MAC control element may be selected from a reserved index. For example, 01100 is selected from 01100 to 10101. Certainly, another reserved sequence number may be selected. This is not limited in this application. The D2D RAPI in the MAC control element in FIG. 7 represents an index of the D2D random access preamble sequence received by the NUE, and a length of the D2D RAPI is six bits, or may be another length. This is not limited in this application. A D2D CQI represents a CQI of a channel between the TUE and the NUE, and a length of the D2D CQI is four bits, or may be another length. This is not limited in this application.

Embodiment 3

A procedure of this embodiment is basically the same as that of Embodiment 2, and a difference lies in the following.

Figure 8:
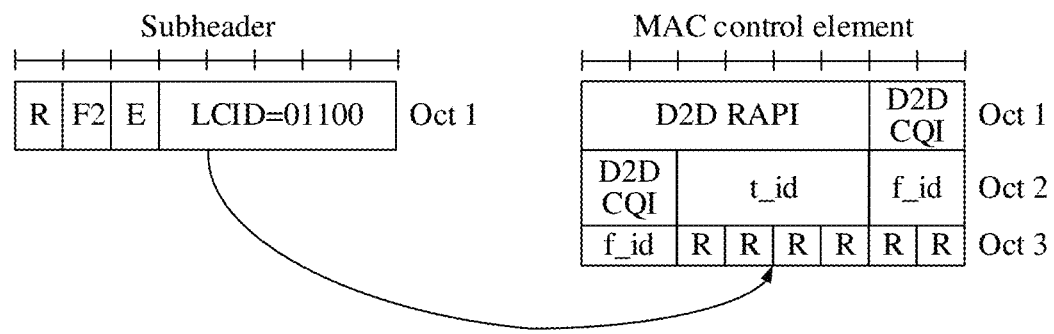
FIG. 8 is a schematic diagram of a MAC subheader and a MAC control element.

NUE may notify a base station of information about a time-frequency resource of a received D2D random access preamble sequence by using a message 3. Specifically, the time-frequency resource information includes a subframe number t_id of a first subframe in a subframe occupied by the D2D random access preamble sequence and a sequence number f_id of a first resource block (RB) in a frequency band occupied by the D2D random access preamble sequence. Based on the f_id and the t_id, the base station may obtain, through calculation, a temporary identifier of an RAR required when an RAR is sent. Therefore, this embodiment provides a MAC control element used to carry the information about the time-frequency resource of the D2D random access preamble sequence. FIG. 8 is a schematic diagram of a MAC subheader and a MAC control element. As shown in FIG. 8, the MAC control element may include a D2D RAPI, a D2D CQI, and time-frequency resource information (for example, an f_id and a t_id in FIG. 8) of a D2D random access preamble sequence. An index corresponding to an LCID value of the MAC control element may be selected from a reserved index. For example, 01100 is selected from 01100 to 10101. Certainly, another reserved sequence number may be selected. This is not limited in this application. The D2D RAPI in the MAC control element in FIG. 8 represents an index of the D2D random access preamble sequence received by the NUE, and a length of the D2D RAPI is six bits, or may be another length. This is not limited in this application. A D2D CQI in the MAC control element represents a CQI of a channel between the TUE and the NUE, and a length of the D2D CQI is four bits, or may be another length. This is not limited in this application. A t_id in the MAC control element represents a subframe number of a first subframe of a subframe occupied by a D2D random access preamble sequence received by the NUE, and a length of the t_id is four bits, or may be another length. This is not limited in this application. An f_id in the MAC control element represents a sequence number of a first RB of a frequency band occupied by a D2D random access preamble sequence received by the NUE, and a length of the f_id is four bits, or may be another length. This is not limited in this application.

Embodiment 4

A procedure of this embodiment is basically the same as that of Embodiment 3, and a difference lies in the following.

Figure 9:
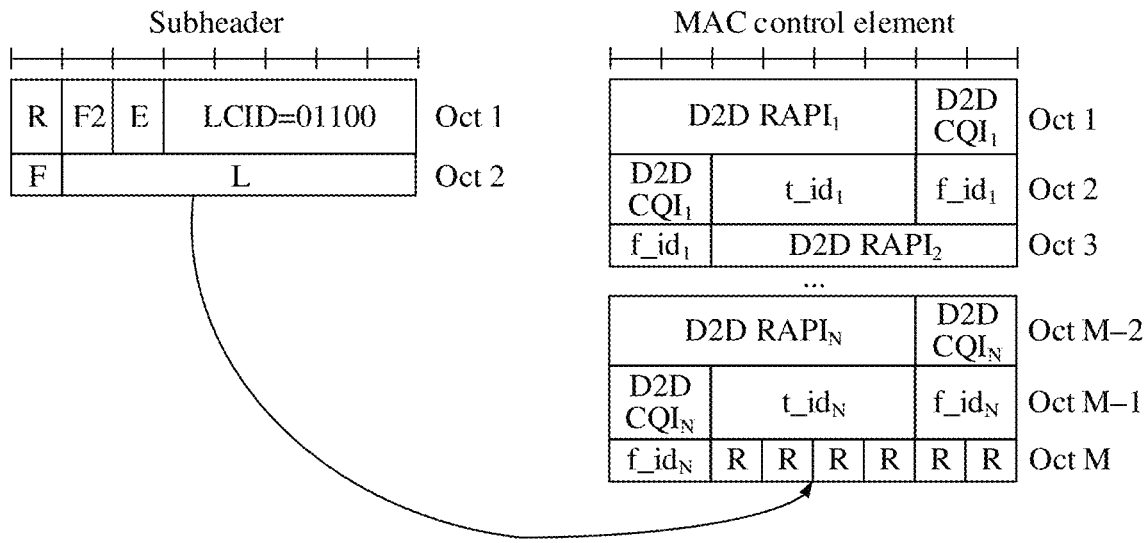
FIG. 9 is a schematic diagram of a MAC subheader and a MAC control element.

NUE may receive a plurality of D2D random access preamble sequences that are sent by TUE. Therefore, when reporting to a base station, the NUE may report information about the plurality of D2D random access preamble sequences to the base station. Therefore, this embodiment provides a MAC control element. FIG. 9 is a schematic diagram of a MAC subheader and a MAC control element. As shown in FIG. 9, the MAC control element may include information about a plurality of D2D random access preamble sequences. An index corresponding to an LCID value of the MAC control element may be selected from a reserved index. For example, 01100 is selected from 01100 to 10101. Certainly, another reserved sequence number may be selected. This is not limited in this application. In FIG. 9, a D2D-RAPI$_1$ represents a sequence index of an $i^{th}$ D2D random access preamble sequence received by NUE. A D2D CQI$_1$ represents a CQI of a channel between the NUE and TUE that sends an $i^{th}$ D2D random access preamble sequence. A t_id$_1$ represents a subframe number of a first subframe in a subframe occupied by an $i^{th}$ D2D random access preamble sequence received by the NUE. An f_id$_1$ represents a sequence number of a first RB in a frequency band occupied by an $i^{th}$ D2D random access preamble sequence received by the NUE. Lengths of the foregoing parameters are not limited in this application.

Embodiment 5

Embodiment 1 to Embodiment 4 are related to a message 3, and the following describes an embodiment of a D2D RAR sent by a base station.

Figure 10:
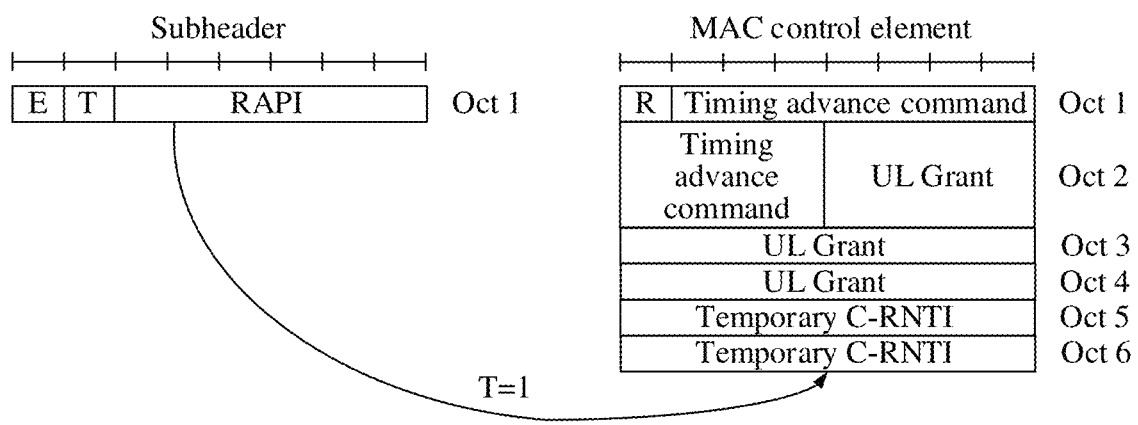
FIG. 10 is a schematic diagram of a MAC subheader and a MAC control element.

In a random access process, after receiving a random access preamble sequence sent by NUE, a base station sends an RAR to the NUE through a PDSCH. The RAR is used to carry a temporary C-RNTI allocated to the NUE, allocate an uplink resource for a to-be-sent message 3 of the NUE, indicate a timing advance, and instruct NUE to back off, and so on. FIG. 10 is a schematic diagram of a MAC subheader and a MAC control element. As shown in FIG. 10, an RAPI in the MAC subheader represents an index of a random access preamble sequence received by a base station. A timing advance command (TAC) in the MAC control element is used to indicate, to the UE, the timing advance. An uplink grant (UL Grant) is used to allocate an uplink resource for a message 3 sent by NUE. The temporary C-RNTI (Temporary C-RNTI) is a temporary C-RNTI allocated by the base station to the NUE.

Figure 11:
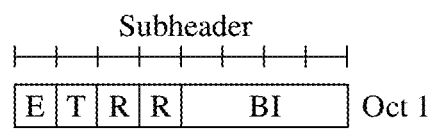
FIG. 11 is a schematic diagram of a subheader for instructing NUE to back off.

A MAC PDU corresponding to the RAR further includes a subheader for instructing the NUE to back off. The subheader has no corresponding MAC control element. FIG. 11 is a schematic diagram of a subheader for instructing NUE to back off. As shown in FIG. 11, BI represents backoff indication, and a length of the BI is four bits. Two subheaders in the MAC PDU corresponding to the RAR may be distinguished by using a flag bit T. For example, T=1 indicates a MAC subheader corresponding to an RAPI, and T=0 indicates that the MAC subheader is used to indicate backoff.

Figure 12:
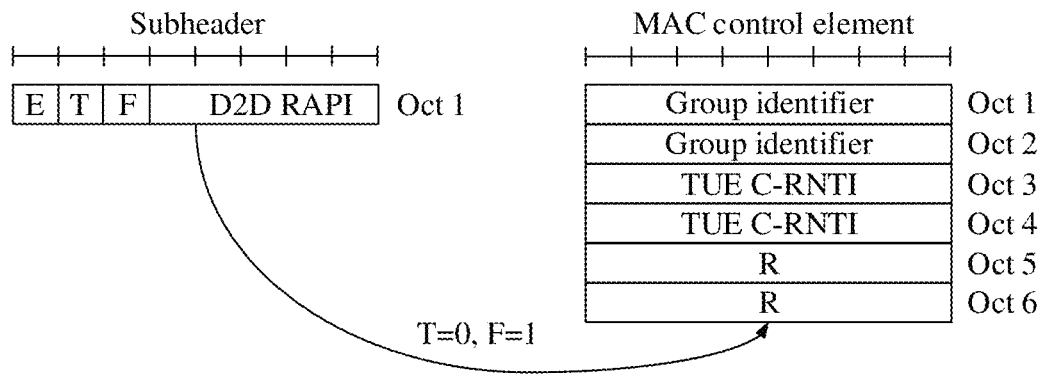
FIG. 12 is a schematic diagram of a MAC subheader and a MAC control element that are corresponding to a D2D RAR.

However, in this embodiment, the D2D RAR sent by the base station is used to notify TUE and NUE (or CUE) of a group identifier of a user equipment cooperation group formed by the TUE and the NUE (or the CUE) and other related information. The base station also does not need to carry a timing advance, uplink resource information, and a temporary C-RNTI in the D2D RAR. Therefore, in this embodiment, the D2D RAR is implemented by reusing an existing RAR. FIG. 12 is a schematic diagram of a MAC subheader and a MAC control element that are corresponding to a D2D RAR. As shown in FIG. 12, on a premise of T=0, a first reserved bit in the MAC subheader for indicating backoff is set to an indicator bit F. When F=1, it indicates that the MAC subheader is a MAC subheader corresponding to the D2D RAR. A second reserved bit and four bits occupied by a BI are used together to indicate a D2D RAPI. Therefore, a length of the D2D RAPI needs to be less than or equal to five bits. For the MAC control element corresponding to the D2D RAR, first two octets of the MAC control element corresponding to the existing RAR are used to represent a user equipment cooperation group identifier allocated by a base station, and middle two octets are used to represent a C-RNTI of the TUE. Last two octets are used as a reserved bit, and may be used to carry other information related to the user equipment cooperation group. It should be noted that, elements in the MAC control element in FIG. 12 may be arranged in another manner. For example, first two bytes represent the C-RNTI of the TUE, and middle two bytes represent the group identifier. This is not limited in this embodiment of this application.

Embodiment 6

A procedure of this embodiment is basically the same as that of Embodiment 5, and a difference lies in the following.

Figure 13:
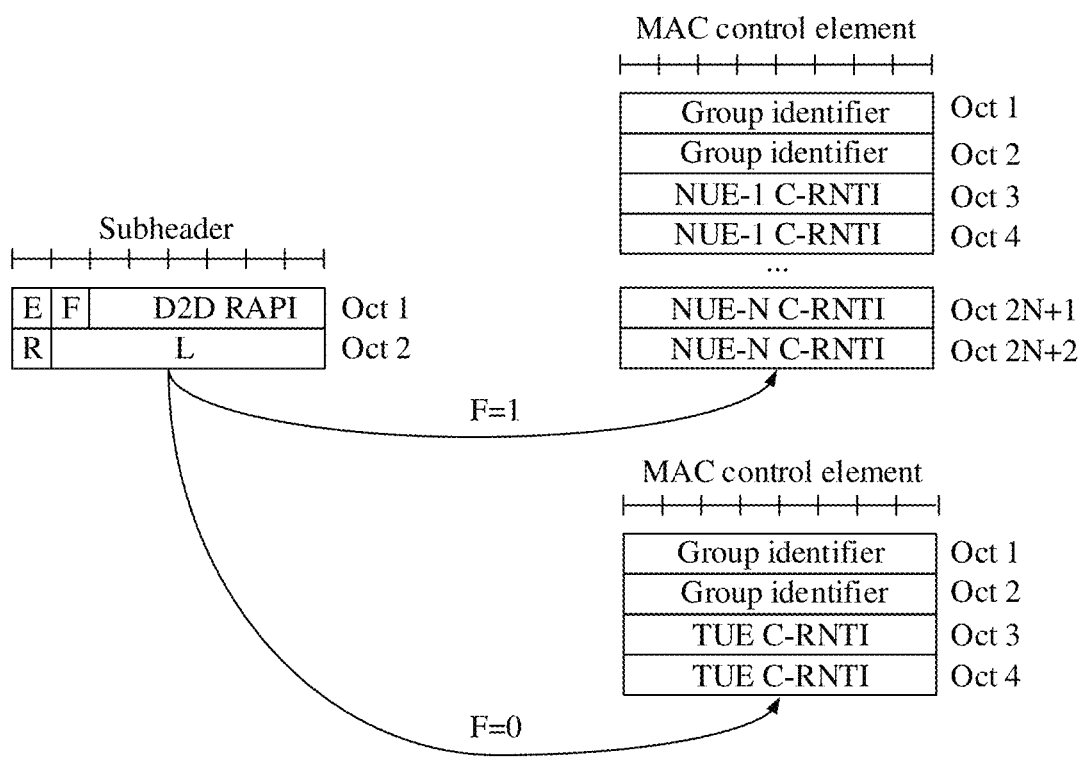
FIG. 13 is a schematic diagram of a MAC subheader and a MAC control element that are corresponding to a D2D RAR.

In addition to implementing a D2D RAR by reusing an existing RAR, the D2D RAR may also be independently designed. When a base station sends the D2D RAR to TUE and NUE to notify the TUE and the NUE information about a user equipment cooperation group, the information notified to the TUE may be different from the information notified to the NUE. Specifically, for the NUE, the base station may notify the NUE of an identifier of the user equipment cooperation group and a C-RNTI of the TUE. For the TUE, the base station may notify the TUE of the identifier of the user equipment cooperation group and C-RNTIs of all NUEs in the user equipment cooperation group. Therefore, a D2D RAR for the TUE and a D2D RAR for the NUE may be separately designed. FIG. 13 is a schematic diagram of a MAC subheader and a MAC control element that are corresponding to a D2D RAR. In the MAC subheader corresponding to the D2D RAR, a flag bit F may be set to represent whether the MAC subheader is corresponding to a D2D RAR for the TUE or a D2D RAR for the NUE. For example, F=1 indicates that the MAC subheader is corresponding to the D2D RAR for the TUE, and F=0 indicates that the MAC subheader is corresponding to the D2D RAR for the NUE.

Figure 14:
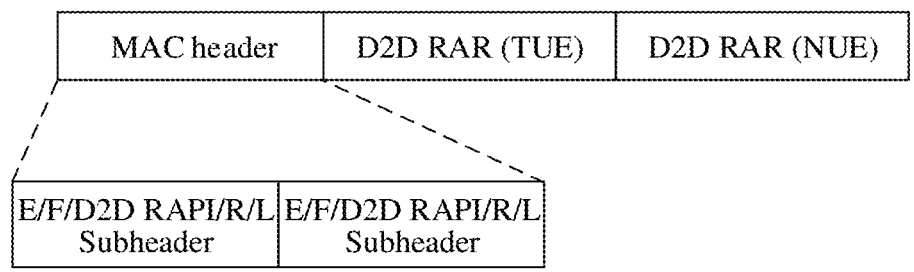
FIG. 14 is a schematic diagram of a MAC PDU corresponding to a D2D RAR.

FIG. 14 is a schematic diagram of a MAC PDU corresponding to a D2D RAR. As shown in FIG. 14, a MAC header of the MAC PDU includes a MAC subheader corresponding to TUE and a MAC subheader corresponding to NUE. The two MAC subheaders respectively are corresponding to two MAC control elements. The two MAC control elements respectively carry D2D RAR information of the TUE and D2D RAR information of the NUE.

In the method according to this embodiment of this application, the NUE adds, to a message 3 used for random access, related information for establishing a group, so that the base station can directly deliver a D2D random access response based on information carried in the message 3. Therefore, the group can be rapidly established to reduce signaling overheads. Further, signaling provided in another embodiment of this application may completely support signaling required in a random access-based user cooperation group establishment process.

Figure 15:
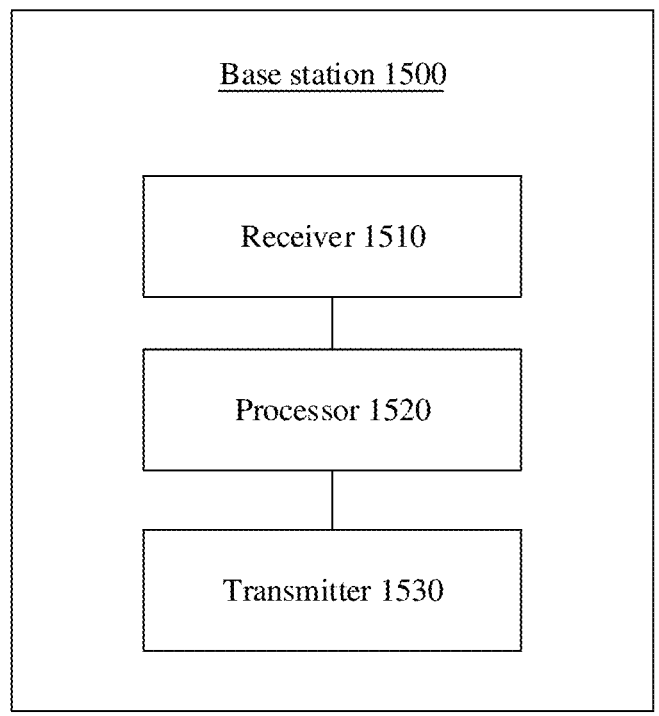
FIG. 15 is a schematic block diagram of a base station 1500 according to an embodiment of this application.

FIG. 15 is a schematic block diagram of a base station 1500 according to an embodiment of this application. Specifically, as shown in FIG. 15, the base station 1500 includes a receiver 1510, a processor 1520, and a transmitter 1530.

The receiver 1510 is configured to receive first signaling from first user equipment. The first signaling carries an identifier of the first user equipment and information about a preamble sequence. The identifier is used for random access between the first user equipment and the base station 1500, and the preamble sequence is used for random access between the first user equipment and second user equipment. The processor 1520 is configured to obtain information about a user equipment cooperation group. The transmitter 1530 is configured to send second signaling to the first user equipment and the second user equipment. The second signaling carries the information about the user equipment cooperation group. The user equipment cooperation group includes the first user equipment and the second user equipment. The first signaling is used for random access between the first user equipment and the base station 1500. For example, the first signaling may be a message 3 in a random access process. The preamble sequence is a device-to-device D2D random access preamble sequence. The first user equipment is neighboring user equipment NUE, and the second user equipment is CUE.

The information about the preamble sequence includes an index of the preamble sequence and/or information about a time-frequency resource occupied by the preamble sequence. The first signaling further carries a channel quality indicator CQI of a channel between the first user equipment and the second user equipment. The information about the user equipment cooperation group is a group identifier of the user equipment cooperation group. The second signaling further carries a cell-radio network temporary identifier C-RNTI of the first user equipment and/or a C-RNTI of the second user equipment.

It should be understood that the base station 1500 shown in FIG. 15 can implement a corresponding process in the method embodiment in FIG. 2 or FIG. 2a. Operations and/or functions of modules in the base station 1500 are respectively used to implement corresponding procedures in the method embodiment in FIG. 2 or FIG. 2a. For details, refer to the descriptions in the foregoing method embodiments. To avoid repetition, details are not described herein again.

Figure 16:
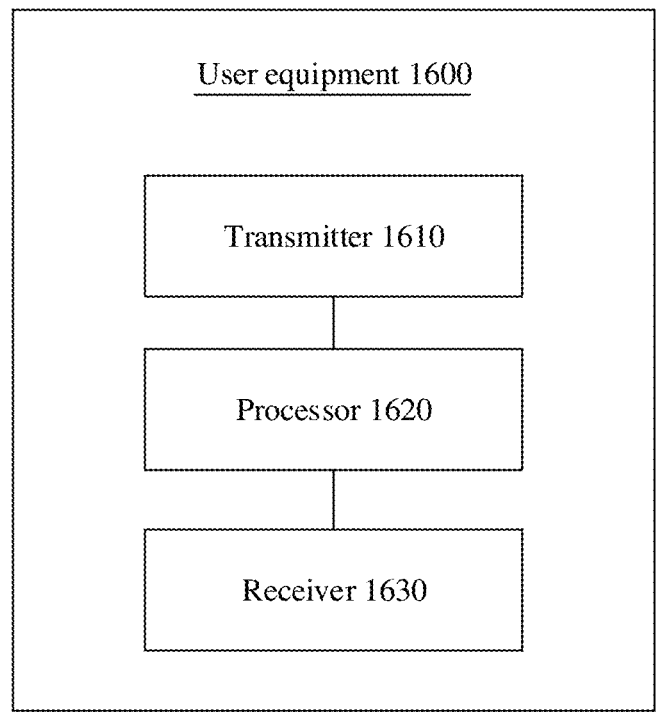
FIG. 16 is a schematic block diagram of user equipment 1600 according to an embodiment of this application.

FIG. 16 is a schematic block diagram of user equipment 1600 according to an embodiment of this application. Specifically, as shown in FIG. 16, the user equipment 1600 includes a transmitter 1610, a processor 1620, and a receiver 1630. The processor 1620 is configured to process signaling or data received by the receiver 1630 and/or output, to the transmitter 1610, signaling or data that needs to be sent.

The transmitter 1610 is configured to send first signaling to a base station. The first signaling carries an identifier of first user equipment and information about a preamble sequence. The identifier is used for random access between the first user equipment and the base station 1500, and the preamble sequence is used for random access between the first user equipment and second user equipment. The receiver 1630 is configured to receive second signaling from the base station 1500. The second signaling carries information about a user equipment cooperation group. The transmitter 1610 is further configured to send a request for establishing the user equipment cooperation group to the second user equipment. The user equipment cooperation group includes the first user equipment and the second user equipment. The first signaling is used for random access between the first user equipment and the base station 1500. For example, the first signaling may be a message 3 in a random access process. The preamble sequence is a device-to-device D2D random access preamble sequence. The first user equipment is neighboring user equipment NUE, and the second user equipment is CUE.

It should be understood that the user equipment 1600 shown in FIG. 16 can implement a corresponding process in the method embodiment in FIG. 2 or FIG. 2b. Operations and/or functions of modules in the user equipment 1600 are respectively used to implement corresponding procedures in the method embodiment in FIG. 2 or FIG. 2b. For details, refer to the descriptions in the foregoing method embodiments. To avoid repetition, details are not described herein again.

In addition, the user equipment 1600 shown in FIG. 16 may be configured to perform a method for establishing a user equipment cooperation group corresponding to NUE, or may be configured to perform a method for establishing a user equipment cooperation group corresponding to CUE.

It should be noted that the processor (for example, the processors in FIG. 15 and FIG. 16) in the embodiments of this application may be an integrated circuit chip that has a signal processing capability. In an implementation process, steps in the foregoing method embodiments can be completed by using a hardware integrated logic circuit in the processor, or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, or the processor may be any conventional processor, or the like. Steps of the methods disclosed with reference to the embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that in the embodiments of this application, the processor may need the memory to storage a corresponding instruction or program. The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limited description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

An embodiment of this application further provides a computer-readable medium. The computer-readable medium stores a computer program. When the computer program is executed by a computer, the computer implements the method for establishing a user equipment cooperation group according to any method embodiment.

An embodiment of this application further provides a computer program product. When the computer program product is executed by a computer, the computer implements the method for establishing a user equipment cooperation group according to any method embodiment.

All or some of the foregoing embodiments may be implemented by using software, hardware, firmware, or any combination thereof. When implemented by the software, all or some of the foregoing embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

An embodiment of this application further provides a processing apparatus, including a processor and an interface. The processor is configured to perform the method for establishing a user equipment cooperation group according to any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

All or some of the foregoing embodiments may be implemented by using software, hardware, firmware, or any combination thereof. When implemented by the software, all or some of the foregoing embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

An embodiment of this application further provides a processing apparatus, including a processor and an interface. The processor is configured to perform the method for establishing a user equipment cooperation group according to any one of the foregoing method embodiments.

It should be understood that the processing apparatus may be a chip. The processor may be implemented by hardware, or may be implemented by software. When implemented by the hardware, the processor may be a logic circuit, an integrated circuit, or the like. When implemented by the software, the processor may be a general-purpose processor. The general-purpose processor is implemented by reading software code stored in a memory. The memory may be integrated into the processor, may be located outside the processor, or may exist independently.

It should be understood that "an embodiment" or "an embodiment" mentioned in the entire specification means that particular features, structures, or characteristics related to the embodiment are included in at least one embodiment of this application. Therefore, "in an embodiment" or "in an embodiment" appearing throughout this specification does not refer to a same embodiment. In addition, these particular features, structures, or characteristics may be combined in one or more embodiments in any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for associated objects and indicates that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining B according to A does not mean that B is determined according to A only; that is, B may be further determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. A disk (Disk) and disc (disc) used in this application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of this application, but is not intended to limit the protection scope of this application. Any modification, equivalent replacement, or improvement made without departing from the principle of this application shall fall within the protection scope of this application.

What is claimed is:

1. A method comprising:
   receiving, by a base station, first signaling from a first user equipment, wherein the first signaling carries an identifier of the first user equipment and information about a preamble sequence, the identifier to be used for random access between the first user equipment and the base station, and the preamble sequence to be used for random access between the first user equipment and second user equipment; and
   sending, by the base station, second signaling to the first user equipment and the second user equipment, wherein the second signaling carries information about a user equipment cooperation group, and wherein the user equipment cooperation group comprises the first user equipment and the second user equipment.

2. The method according to claim 1, wherein the information about the preamble sequence comprises at least one of an index of the preamble sequence or information about a time-frequency resource occupied by the preamble sequence.

3. The method according to claim 2, wherein the first signaling further carries a channel quality indicator (CQI) of a channel between the first user equipment and the second user equipment.

4. The method according to claim 1, wherein the information about the user equipment cooperation group is a group identifier of the user equipment cooperation group.

5. The method according to claim 4, wherein the second signaling further carries at least one of a cell-radio network temporary identifier (C-RNTI) of the first user equipment and a C-RNTI of the second user equipment.

6. A base station comprising:
   a receiver configured to receive first signaling from a first user equipment, wherein the first signaling carries an identifier of the first user equipment and information about a preamble sequence, the identifier to be used for random access between the first user equipment and the base station, and the preamble sequence to be used for random access between the first user equipment and second user equipment;
   a processor configured to obtain information about a user equipment cooperation group, wherein the user equipment cooperation group comprises the first user equipment and the second user equipment; and
   a transmitter configured to send second signaling to the first user equipment and the second user equipment, wherein the second signaling carries the information about the user equipment cooperation group.

7. The base station according to claim 6, wherein the information about the preamble sequence comprises at least one of an index of the preamble sequence or information about a time-frequency resource occupied by the preamble sequence.

8. The base station according to claim 7, wherein the first signaling further carries a channel quality indicator (CQI) of a channel between the first user equipment and the second user equipment.

9. The base station according to claim 6, wherein the information about the user equipment cooperation group is a group identifier of the user equipment cooperation group.

10. The base station according to claim 9, wherein the second signaling further carries at least one of a cell-radio network temporary identifier (C-RNTI) of the first user equipment and a C-RNTI of the second user equipment.

11. A first user equipment comprising:
    a transmitter configured to send a first signaling to a base station, wherein the first signaling carries an identifier of the first user equipment and information about a preamble sequence, the identifier to be used for random access between the first user equipment and the base station, and the preamble sequence to be used for random access between the first user equipment and second user equipment; and
    a receiver configured to receive second signaling from the base station, wherein the second signaling carries information about a user equipment cooperation group, and wherein the user equipment cooperation group comprises the first user equipment and the second user equipment,
    wherein the transmitter is further configured to send a request for establishing the user equipment cooperation group at the second user equipment.

12. The first user equipment according to claim 11, wherein the information about the preamble sequence comprises at least one of an index of the preamble sequence and information about a time-frequency resource occupied by the preamble sequence.

13. The first user equipment according to claim 12, wherein the first signaling further carries a channel quality indicator (CQI) of a channel between the first user equipment and the second user equipment.

14. The first user equipment according to claim 11, wherein the information about the user equipment cooperation group is a group identifier of the user equipment cooperation group.

15. The first user equipment according to claim 14, wherein the second signaling further carries at least one of a cell-radio network temporary identifier (C-RNTI) of the first user equipment and a C-RNTI of the second user equipment.

* * * * *